Patented Aug. 10, 1943

2,326,699

UNITED STATES PATENT OFFICE 2,326,699

COATING COMPOSITION CONTAINING POLYISOBUTYLENE

Robert C. Swain, Riverside, and Pierrepont Adams, Stamford, Conn., assignors to American Cyanamid Company, New York, N. Y., a corporation of Maine No Drawing. Application December 26, 1940, Serial No. 371,784

2 Claims. (Cl. 260—42)

This invention relates to coating compositions containing polyisobutylene and melamine-formaldehyde resins.

An object of this invention is to improve the physical and chemical properties of coating compositions containing polyisobutylene, e. g., chemical resistance, heat resistance, etc., as well as to decrease the thermoplasticity.

Another object of this invention is to provide compositions containing polyisobutylene and compatible proportions of compatible melamine-formaldehyde resins.

These and other objects are attained by blending polyisobutylene with not more than 40% (total solids weight basis) of a melamine-formaldehyde resin which has been alkylated with a butyl alcohol wherein the molal ratio of formaldehyde to melamine is at least about 4:1.

The following examples in which the proportions are in parts by weight are given by way of illustration and not in limitation.

The polyisobutylene used in the following examples has an average molecular weight of about 7000.

Polyisobutylene resins may be conveniently produced by any of the methods which are well known in the art. Among these is the polymerization of isobutylene generally at low temperature in the presence of a suitable catalyst such as boron trifluoride.

Example 1

| | Parts |
|---|---|
| Melamine-formaldehyde resin "A" | 10 |
| Polyisobutylene | 90 |

A composition containing these ingredients is prepared by admixing 20 parts of melamine-formaldehyde resin "A" solution (50% resin) with 180 parts of "polyisobutylene stock solution" (containing 50% of polyisobutylene and 50% of xylene. Films of the composition are applied to metal objects and baked at a temperature of about 135° C. for about one-half hour. The product is a transparent coating having good film strength.

Example 2

| | Parts |
|---|---|
| Melamine-formaldehyde resin "B" | 25 |
| Polyisobutylene | 75 |

A composition containing these ingredients is prepared by admixing 50 parts of melamine-formaldehyde resin "B" solution (50% resin) with 150 parts of "polyisobutylene stock solution." Films of the composition are applied to metal objects and baked at a temperature of about 135° C. for about one-half hour. A clear, tough film is formed.

Example 3

| | Parts |
|---|---|
| Melamine-formaldehyde resin "C" | 10 |
| Polyisobutylene | 90 |

A composition containing these ingredients is prepared by admixing 20 parts of melamine-formaldehyde resin "C" solution (50% resin) with 180 parts of "polyisobutylene stock solution." Films of the composition are applied to metal objects and baked at a temperature of about 135° C. for about one-half hour. The product formed is a clear coating.

*Preparation of melamine-formaldehyde resin "A"*

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "B"*

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

*Preparation of melamine-formaldehyde resin "C"*

| | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., benzene, toluene, xylene, etc., may be added to the original solutions of polyisobutylene and melamine-formaldehyde resin in order to produce perfectly clear solutions if such solutions are not originally obtained.

While formaldehyde has been used in the previous examples, it will be obvious that the various polymers of formaldehyde, e. g., paraformaldehyde, or substances which yield formaldehyde may be used in place of part or all of the formaldehyde.

As indicated by the above examples, polyisobutylene has been found to be compatible with not more than 40% of a melamine-formaldehyde resin which has been alkylated with a butyl alcohol wherein the molal ratio of formaldehyde to melamine is at least about 4:1. Furthermore up to about 15% of melamine-formaldehyde resins which have been alkylated with an octyl alcohol wherein the molal ratio of formaldehyde to melamine is about 4:1 are compatible with polyisobutylene. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine. The percentage composition in each instance in this paragraph is on a total solids weight basis.

The melamine-formaldehyde resins may be alkylated with n-butyl alcohol as in the above examples or they may be alkylated with other butyl alcohols or mixtures of butyl alcohols. The term "alkylated melamine-formaldehyde resin" is intended to denote compositions which are reacted with an alcohol.

Our products may be plasticized with a wide variety of materials such as the alkyl phthalates, tricresyl phosphate, various alkyd resins, particularly the fatty oil acid modified alkyd resins, etc.

Various fillers, pigments, dyes and lakes may be added to our compositions, e. g., lithopone, zinc oxide, titanium oxide, ferric oxide, Prussian blue, toluidine red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Other resinous compositions may be included in various coating compositions, e. g., urea-formaldehyde resins, pheno'-formaldehyde resins, alkyd resins, ethyl cellulose, cellulose acetate, nitrocellulose, etc., as well as in varnishes, especially drying oil varnishes, such as those from tung oil, linseed oil, etc. Other polymeric materials may also be added to our compositions such as the synthetic rubbers produced from butadiene and the like.

Our mixtures have a wide variety of uses in the production of adhesives, chemically resistant coatings, in the treatment of textiles, paper, leather, etc., as well as in the production of lacquers, paints, enamels, etc. Our products are particularly useful in the manufacture of electrical insulating materials.

Our mixed compositions have excellent acid and alkali resistance, good water resistance and in fact generally good all round chemical resistance. The melamine-formaldehyde resins decrease the thermoplastic property of the polyisobutylene resin and on the other hand, the polyisobutylene resin tends to flexibilize the melamine resin. Furthermore, the melamine-formaldehyde resin reduces the sensitivity to solvents which is characteristic of the polyisobutylene resin.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing polyisobutylene and a melamine-formaldehyde resin which has been heated until reacted with a butyl alcohol wherein the molal ratio of formaldehyde to melamine is at least about 4:1 wherein the weight ratio of polyisobutylene to melamine resin is at least 3:2.

2. A coating composition containing polyisobutylene and a melamine-formaldehyde resin which has been heated until reacted with n-butyl alcohol wherein the molal ratio of formaldehyde to melamine is at least about 4:1 wherein the weight ratio of polyisobutylene to melamine resin is at least 3:2.

ROBERT C. SWAIN.
PIERREPONT ADAMS.